March 23, 1965 P. L. RUBEN 3,174,396
MICROSCOPE OBJECTIVE
Filed Nov. 30, 1962
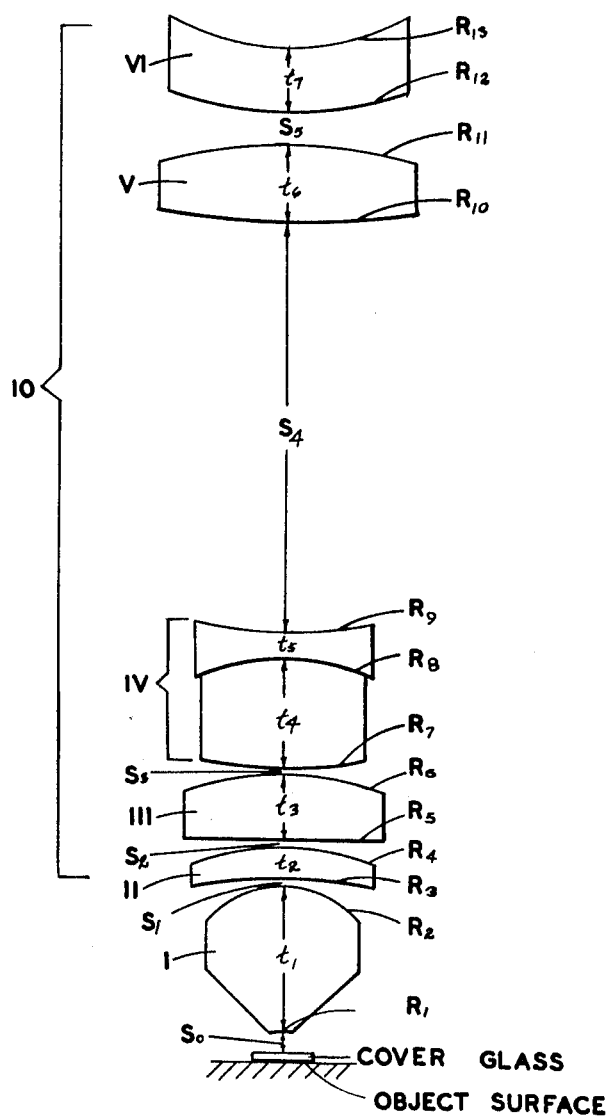
INVENTOR.
PAUL L. RUBEN
BY Frank C. Parker
ATTORNEY

United States Patent Office 3,174,396
Patented Mar. 23, 1965

3,174,396
MICROSCOPE OBJECTIVE
Paul L. Ruben, Rochester, N.Y., assignor to Bausch & Lomb Incorporated, Rochester, N.Y., a corporation of New York
Filed Nov. 30, 1962, Ser. No. 241,369
10 Claims. (Cl. 88—57)

This invention relates to optical objectives and, more particularly, to microscope objectives having a magnification of substantially 30×.

Microscope objectives generally are difficult to design when the performance requirements call for a nearly optimumly flat field combined with an even illumination thereof, and these requirements are made more difficult when it is desired to eliminate as far as possible such image aberrations as spherical aberration and coma as well as lateral and longitudinal chromatism.

In view of the above-mentioned difficulties, it is an object of this invention to provide a novel microscope objective having as simple an optical form as possible consistent with high performance.

It is a further object to provide such a microscope objective having a magnification of substantially 30×, a numerical aperture of substantially 0.65 and an essentially flat field.

Another object of this invention is to provide such an objective which is effectively diffraction-limited in performance over the entire field in the eyepiece focal plane, said objective transmitting a minimum of about 77% of the meridional ray fan at the edge of the field.

Further objects and advantages of this invention will be apparent in the details of construction and arrangement of the parts from a study of the specification herebelow taken in connection with the accompanying drawing, in which the single figure represents a preferred embodiment thereof.

A microscope objective constructed according to the novel features of this invention is shown generally by the numeral 10 in the drawing and in this figure the objective is shown comprised of a front singlet meniscus lens member I having positive power and spaced rearwardly from the object or specimen surface. The distance from the vertex of the front lens surface of lens member I to the object surface includes a cover plate having a thickness dimension of .025F, and the distance $S_0$ from the cover plate to said vertex is substantially .088F where F designates the equivalent focal length of the entire objective. The objective 10 further comprises five other lens members which will be described hereinafter and which are all optically aligned with each other, the first four lens members being closely grouped on one side of a large air space and the remaining two lens members being grouped on the rear side of said air space.

Spaced rearwardly from lens member I is a second meniscus lens of convex-concavo form having positive power and having its concave surface facing toward said object, said second lens being designated by numeral II. Rearwardly spaced from the lens II is a third lens member which is preferably constructed in the form of a plano-convex lens which is designated III and has positive power. The plano surface thereof faces said object. Still further rearwardly is spaced a fourth lens member which is designated IV and which is constructed in meniscus form with the concave side facing rearwardly. Said lens member IV is composed of a front double convex lens element of positive power which is in contact with a rearward double concave lens element of negative power. Following the lens member IV is the aforesaid large air space to the rear of which lies a double convex positive lens member which is designated V, the more strongly curved lens surface of which faces rearwardly. Spaced still further rearwardly from lens member V is a negative meniscus lens member having a concave surface which faces rearwardly, said negative meniscus lens being designated by VI.

In order to achieve the objects of this invention, the optical parameters of the objective should be chosen as specified in the table of mathematical statements or expressions given in the form of ranges of values herebelow, wherein the individual focal lengths of the successive lens members I–VI are designated $F_I$–$F_{VI}$, respectively, the successive interlens air spaces being designated by $S_1$–$S_5$, and the axial thicknesses of the successive lens members and lens elements being designated by $t_1$–$t_7$, the minus (—) sign used with the focal designations denote negative lens power.

$$2.73F < F_I < 3.83F$$
$$6.18F < F_{II} < 7.56F$$
$$2.30F < F_{III} < 3.82F$$
$$5.24F < F_{IV} < 6.41F$$
$$3.42F < F_V < 4.18F$$
$$7.38F < F_{VI} < 9.02F$$
$$.01256F < S_1 < .01534F$$
$$.01256F < S_2 < .01534F$$
$$.01256F < S_3 < .01534F$$
$$2.00F < S_4 < 2.45F$$
$$.150F < S_5 < .184F$$
$$.715F < t_1 < .873F$$
$$.150F < t_2 < .184F$$
$$.313F < t_3 < .383F$$
$$.501F < t_4 < .613F$$
$$.125F < t_5 < .153F$$
$$.376F < t_6 < .460F$$
$$.326F < t_7 < .398F$$

A corresponding range of values for the radii of curvature of the successive lens surfaces which are designated $R_1$–$R_{13}$ is given in the table of mathematical statements herebelow, wherein the minus (—) sign denotes radii whose center of curvature lie on the object side of the vertex of the respective surfaces. The corresponding values $n_D$ and $\nu$ which are related to the refractive index and Abbe number, respectively, are given as ranges of values in the table of mathematical statements herebelow with respect to each successive lens element.

$.352F < -R_1 < .430F$
$.519F < -R_2 < .633F$
$1.782F < -R_3 < 2.178F$
$1.254F < -R_4 < 1.532F$
$R_5 > \pm 10.0F$
$1.424F < -R_6 < 1.740F$
$1.985F < R_7 < 2.425F$
$1.084F < -R_8 < 1.324F$
$2.060F < R_9 < 2.520F$
$17.15F < R_{10} < 20.95F$
$2.394F < -R_{11} < 2.926F$
$1.782F < R_{12} < 2.178F$
$1.231F < R_{13} < 1.503F$

| | $n_D$ | $\nu$ |
|---|---|---|
| (Lens Member I) | $1.615 < n_D < 1.625$ | $58.0 < \nu < 63.0$ |
| (Lens Member II) | $1.615 < n_D < 1.625$ | $58.0 < \nu < 63.0$ |
| (Lens Member III) | $1.615 < n_D < 1.625$ | $58.0 < \nu < 63.0$ |
| (Lens Member IV) (pos. element) | $1.615 < n_D < 1.625$ | $58.0 < \nu < 63.0$ |
| (Lens Member IV) (neg. element) | $1.800 < n_D < 1.810$ | $22.0 < \nu < 28.0$ |
| (Lens Member V) | $1.612 < n_D < 1.622$ | $34.0 < \nu < 38.0$ |
| (Lens Member VI) | $1.715 < n_D < 1.725$ | $27.0 < \nu < 32.0$ |

More specifically, the values for individual focal lengths of the lens members together with the interlens spaces and individual lens elements thicknesses as mentioned above are given in terms of the equivalent focal length F of the objective in the table of mathematical statements herebelow.

$F_I = 3.03F$
$F_{II} = 6.875F$
$F_{III} = 2.560F$
$F_{IV} = 5.825F$
$F_V = 3.803F$
$-F_{VI} = 8.20F$
$S_1 = .01395F$
$S_2 = .01395F$
$S_3 = .01395F$
$S_4 = 2.226F$
$S_5 = .167F$
$t_1 = .794F$
$t_2 = .167F$
$t_3 = .348F$
$t_4 = .557F$
$t_5 = .1395F$
$t_6 = .418F$
$t_7 = .362F$

Furthermore, preferred specific values are given for the radii of the successive lens surfaces $R_1$–$R_{13}$ in the mathematical table herebelow together with preferred specific designations of the refractive index $n_D$ and the Abbe number $\nu$.

| | |
|---|---|
| $-R_1 = .391F$ | $-R_8 = 1.204F$ |
| $-R_2 = .576F$ | $R_9 = 2.290F$ |
| $-R_3 = 1.98F$ | $R_{10} = 19.05F$ |
| $-R_4 = 1.393F$ | $-R_{11} = 2.66F$ |
| $R_5 = \infty$ | $R_{12} = 1.98F$ |
| $-R_6 = 1.582F$ | $R_{13} = 1.367F$ |
| $R_7 = 2.205F$ | |

$$n_D(I) = n_D(II) = n_D(III) = \left\{\begin{array}{c} n_D(IV) \\ \text{for positive element} \end{array}\right\} = 1.620$$

$$n_D(IV) = 1.805 \text{ (for negative element)}$$

$$n_D(V) = 1.617$$

$$n_D(VI) = 1.720$$

$$\nu(I) = \nu(II) = \nu(III) = \left\{\begin{array}{c} \nu(IV) \\ \text{for positive element} \end{array}\right\} = 60.3$$

$$\left\{\begin{array}{c} \nu(IV) \\ \text{for negative element} \end{array}\right\} = 25.4$$

$$\nu(V) = 36.6$$

$$\nu(VI) = 29.3$$

Furthermore, the ratio of the lens curvatures of the respective lens members I–VI are given in the table herebelow.

| | |
|---|---|
| $\dfrac{-R_1}{-R_2} = .682$ | $\dfrac{-R_3}{-R_4} = 1.419$ |
| $\dfrac{R_5}{-R_6} = 6.290$ | $\dfrac{R_7}{-R_8} = 1.831$ |
| $\dfrac{R_9}{-R_8} = 1.902$ | $\dfrac{R_{10}}{-R_{11}} = 7.16$ |
| $\dfrac{R_{12}}{R_{13}} = 1.443$ | |

One specific example of the present invention is given numerically with respect to all of the optical parameters thereof in the chart herebelow, wherein the designations for focal lengths, lens radii, lens thicknesses and spacings as well as the designations for refractive index and Abbe number all remain the same as given in the examples hereabove, all scalar quantities being given in millimeters.

In the above-described objectives, the object distance includes a cover plate of .18 mm. thickness and the distance $S_0$ from the cover to the front vertex of lens I is 0.63 mm. The objective is further corrected for diffraction-limited performance for a field of 20 mm. diameter in the eyepiece focal plane.

Although only a single specific form of the invention has been shown and described in detail, other forms of the invention are possible and changes may be made in the specific optical parameters within the ranges given and changes may be made in the arrangement without departing from the spirit of the invention as defined in the claims appended herebelow.

I claim:

1. A microscope objective having a magnification of substantially 30× (a numerical aperture of substantially 0.65, a flat field, and a substantially diffraction-limited performance throughout the visual spectrum over the entire field, said objective comprising successively a front positive meniscus lens member I, a second positive meniscus lens member II, both of which are concave toward the object side of the objective, a collective lens member III, a compound positive lens member IV composed of a front positive lens element and a rear negative lens element, a second collective lens member V, and a rearmost negative meniscus lens member VI which is concave toward the image, all of said lens members being optically aligned and spaced from each other, the focal lengths $F_I$ to $F_{VI}$ of the successive lens members I to VI respectively, the successive interlens air spaces $S_1$ to $S_5$, and the axial thicknesses $t_1$ to $t_7$ of the successive lens elements and members being given in the table of mathematical expressions herebelow wherein F represents the equivalent focal length of said objective, and the minus (−) sign denotes negative power, $$2.73F < F_I < 3.83F$$
$$6.18F < F_{II} < 7.56F$$
$$2.30F < F_{III} < 3.82F$$
$$5.24F < F_{IV} < 6.41F$$
$$3.42F < F_V < 4.18F$$
$$7.38F < -F_{VI} < 9.02F$$
$$.01256F < S_1 < .01534F$$
$$.01256F < S_2 < .01534F$$
$$.01256F < S_3 < .01534F$$
$$2.00F < S_4 < 2.45F$$
$$.150F < S_5 < .184F$$
$$.715F < t_1 < .873F$$

[E.F.L. = 7.1686; magnification = 30×; N.A. = 0.65]

| Lens | Focal Length | Radii | Thicknesses | Spaces | $n_D$ | $\nu$ |
|---|---|---|---|---|---|---|
| I | $F_I = 21.824$ | $-R_1 = 2.8054$ | $t_1 = 5.7$ | | 1.620 | 60.3 |
| | | $-R_2 = 4.1305$ | | $S_1 = 0.1$ | | |
| II | $F_{II} = 49.220$ | $-R_3 = 14.191$ | $t_2 = 1.2$ | | 1.620 | 60.3 |
| | | $-R_4 = 10.000$ | | $S_2 = 0.1$ | | |
| III | $F_{III} = 18.348$ | $R_5 = \infty$ | $t_3 = 2.5$ | | 1.620 | 60.3 |
| | | $-R_6 = 11.376$ | | $S_3 = 0.1$ | | |
| IV | $F_{IV} = 41.807$ | $R_7 = 15.849$ | $t_4 = 4.0$ | | 1.620 | 60.3 |
| | | $-R_8 = 8.6298$ | $t_5 = 1.0$ | | 1.805 | 25.4 |
| | | $R_9 = 16.444$ | | $S_4 = 16.0$ | | |
| V | $F_V = 27.307$ | $R_{10} = 136.77$ | $t_6 = 3.0$ | | 1.617 | 36.6 |
| | | $-R_{11} = 19.055$ | | $S_5 = 1.2$ | | |
| VI | $F_{VI} = -58.902$ | $R_{12} = 14.191$ | $t_7 = 2.6$ | | 1.720 | 29.3 |
| | | $R_{13} = 9.8175$ | | | | |

$.150F < t_2 < .184F$ $.313F < t_3 < .383F$ $.501F < t_4 < .613F$ $.125F < t_5 < .153F$ $.376F < t_6 < .460F$ $.326F < t_7 < .398F$

2. A microscope objective having a magnification of substantially 30×, a numerical aperture of substantially 0.65, a flat field, and a substantially diffraction-limited performance throughout the visual spectrum over the entire field, said objective comprising successively a front concavo-convex singlet lens member I which is nearest to and is concave toward the object, a second concavo-convex singlet lens member II spaced rearwardly from the first lens member and having its concave side facing said object, a plano-convex lens member III having its plano side spaced from said second lens member, a compound meniscus lens member IV composed of a front double convex lens element spaced rearwardly from said plano-convex member and further composed of a double concave lens element in contact with the rear side of the double convex element, a double convex singlet lens member V spaced rearwardly of said compound lens member, and a meniscus singlet lens member VI having a concave surface facing rearwardly, said lens members being optically aligned with each other, the focal lengths $F_I$ to $F_{VI}$ of the successive lens members I to VI respectively, the successive interlens air spaces $S_1$ to $S_5$, and the axial thicknesses $t_1$ to $t_7$ of the successive lens elements and members being given in the table of mathematical expressions herebelow wherein F represents the equivalent focal length of said objective, and the minus (—) sign denotes negative power, $2.73F < F_I < 3.83F$ $6.18F < F_{II} < 7.56F$ $2.30F < F_{III} < 3.82F$ $5.24F < F_{IV} < 6.41F$ $3.42F < F_V < 4.18F$ $7.38F < -F_{VI} < 9.02F$ $.01256F < S_1 < .01534F$ $.01256F < S_2 < .01534F$ $.01256F < S_3 < .01534F$ $2.00F < S_4 < 2.45F$ $.150F < S_5 < .184F$ $.715F < t_1 < .873F$ $.150F < t_2 < .184F$ $.313F < t_3 < .383F$ $.501F < t_4 < .613F$ $.125F < t_5 < .153F$ $.376F < t_6 < .460F$ $.326F < t_7 < .398F$ 3. A microscope objective having a magnification of substantially 30×, a numerical aperture of substantially 0.65, a flat field, and a substantially diffraction-limited performance throughout the visual spectrum over the entire field, said objective comprising successively a front concavo-convex singlet lens member I which is nearest to and is concave toward the object, a second concavo-convex singlet lens member II spaced rearwardly from the first lens member and having its concave side facing said object, a plano-convex lens member III having its plano side spaced from said second lens member, a compound meniscus lens member IV composed of a front double convex lens element spaced rearwardly from said plano-convex member and further composed of a double concave lens element in contact with the rear side of the double convex element, a double convex singlet lens member V spaced rearwardly of said compound lens member, and a meniscus singlet lens member VI having a concave surface facing rearwardly, said lens members being optically aligned with each other, the focal lengths $F_I$ to $F_{VI}$ related to the successive lens members I to VI respectively, the successive interlens air spaces $S_1$ to $S_5$, the successive axial thicknesses $t_1$ to $t_7$ of the lens elements and members being given in the table of mathematical expressions herebelow wherein F represents the equivalent focal length of said objective and the minus (—) sign denotes negative power,

| | |
|---|---|
| $F_I = 3.03F$ | $t_1 = .794F$ |
| $F_{II} = 6.875F$ | $t_2 = .167F$ |
| $F_{III} = 2.560F$ | $t_3 = .348F$ |
| $F_{IV} = 5.825F$ | $t_4 = .557F$ |
| $F_V = 3.803F$ | $t_5 = .1395F$ |
| $-F_{VI} = 8.20F$ | $t_6 = .418F$ |
| $S_1 = .01395F$ | $t_7 = .362F$ |
| $S_2 = .01395F$ | |
| $S_3 = .01395F$ | |
| $S_4 = 2.226F$ | |
| $S_5 = .167F$ | |

4. A microscope objective as set forth in claim 1 further characterized by said positive element in lens member IV having a focal length between 1.208F and 1.476F, and said negative element of lens member IV having a focal length between —.866F and —1.068F.

5. A microscope objective as set forth in claim 3 further characterized by said double convex lens element in the compound lens member having a focal length of substantially 1.342F and said double concave lens element in said compound lens member having a focal length of substantially —.962F.

6. A microscope objective having a magnification of substantially 30×, a numerical aperture of substantially 0.65, a flat field, and a substantially diffraction-limited performance throughout the visual spectrum over the entire field, said objective comprising successively a front concavo-convex singlet lens member I which is nearest to and is concave toward the object, a second concavo-convex singlet lens member II spaced rearwardly from the first lens member and having its concave side facing said object, a plano-convex lens member III having its plano side spaced from said second lens member, a compound meniscus lens member IV composed of a front double convex lens element spaced rearwardly from said plano-convex member and further composed of a double concave lens element in contact with the rear side of the double convex element, a double convex singlet lens member V spaced rearwardly of said compound lens member, and a meniscus singlet lens member VI having a concave surface facing rearwardly, said lens members being optically aligned with each other, the radii of curvature $R_1$ to $R_{13}$ of the successive lens surfaces for the lens members and elements having numerical values which are given in the table of mathematical expressions given herebelow wherein the minus (—) sign denotes radii whose centers of curvature lie on the object side of the vertex of the respective surfaces, the values for the successive interlens air spaces $S_1$ to $S_5$, and the values for the axial lens thicknesses $t_1$ to $t_7$ being as given in the aforesaid table, wherein F designates the equivalent focal length of said objective, $.352F < -R_1 < .430F$ $.519F < -R_2 < .633F$ $1.782F < -R_3 < 2.178F$ $1.254F < -R_4 < 1.532F$ $R_5 > \pm 10.0F$ $1.424F < -R_6 < 1.740F$ $1.985F < R_7 < 2.425F$ $1.084F < -R_8 < 1.324F$ $2.060F < R_9 < 2.520F$ $17.15F < R_{10} < 20.95F$
$2.394F < -R_{11} < 2.926F$
$1.782F < R_{12} < 2.178F$
$1.231F < R_{13} < 1.503F$
$.01256F < S_1 < .01534F$
$.01256F < S_2 < .01534F$
$.01256F < S_3 < .01534F$
$2.00F < S_4 < 2.45F$
$.150F < S_5 < .184F$
$.715F < t_1 < .873F$
$.150F < t_2 < .184F$
$.313F < t_3 < .383F$
$.501F < t_4 < .613F$
$.125F < t_5 < .153F$
$.376F < t_6 < .460F$
$.326F < t_7 < .398F$ 7. A microscope objective having a magnification of substantially 30×, a numerical aperture of substantially 0.65, a flat field, and a substantially diffraction-limited performance throughout the visual spectrum over the entire field, said objective comprising successively a front concavo-convex singlet lens member I which is nearest to and is concave toward the object, a second concavo-convex singlet lens member II spaced rearwardly from the first lens member and having its concave side facing said object, a plano-convex lens member III having its plano side spaced from said second lens member, a compound meniscus lens member IV composed of a front double convex lens element spaced rearwardly from said plano convex member and further composed of a double concave lens element in contact with the rear side of the double convex element, a double convex singlet lens member V spaced rearwardly of said compound lens member, and a meniscus singlet lens member VI having a concave surface facing rearwardly, said lens members being optically aligned with each other, the radii of curvature $R_1$ to $R_{13}$ of the successive lens surfaces for the lens members and elements having numerical values which are given in the table of mathematical expressions given herebelow wherein the minus (—) sign denotes radii whose centers of curvature lie on the object side of the vertex of the respective surfaces, the values for the successive interlens air spaces $S_1$ to $S_5$, and the values for the axial lens thicknesses $t_1$ to $t_7$ being as given in the aforesaid table, wherein F designates the equivalent focal length of said objective, $-R_1 = .391F$  $S_1 = S_2 = S_3 = .01395F$
$-R_2 = .576F$  $S_4 = 2.226F$
$-R_3 = 1.98F$  $S_5 = .167F$
$-R_4 = 1.393F$
$R_5 = \infty$
$-R_6 = 1.582F$  $t_1 = .794F$
$R_7 = 2.205F$  $t_2 = .167F$
$-R_8 = 1.204F$  $t_3 = .348F$
$R_9 = 2.290F$  $t_4 = .557F$
$R_{10} = 19.05F$  $t_5 = .1395F$
$-R_{11} = 2.66F$  $t_6 = .418F$
$R_{12} = 1.98F$  $t_7 = .362F$
$R_{13} = 1.367F$ 8. A microscope objective as set forth in claim 6 additionally characterized by the value of the refractive index $n_D$ and Abbe number $\nu$ of the glasses in the successive lens elements and lens members I to VI being as given in the table of mathematical expressions herebelow,

| Lens | $n_D$ | $\nu$ |
|---|---|---|
| (Lens Member I) | $1.615 < n_D < 1.625$ | $58.0 < \nu < 63.0$ |
| (Lens Member II) | $1.615 < n_D < 1.625$ | $58.0 < \nu < 63.0$ |
| (Lens Member III) | $1.615 < n_D < 1.625$ | $58.0 < \nu < 63.0$ |
| (Lens Member IV) (pos. element) | $1.615 < n_D < 1.625$ | $58.0 < \nu < 63.0$ |
| (Lens Member IV) (neg. element) | $1.800 < n_D < 1.810$ | $22.0 < \nu < 28.0$ |
| (Lens Member V) | $1.612 < n_D < 1.622$ | $34.0 < \nu < 38.0$ |
| (Lens Member VI) | $1.715 < n_D < 1.725$ | $27.0 < \nu < 32.0$ |

9. A microscope objective having a magnification of substantially 30×, a numerical aperture of substantially 0.65, a flat field, and a substantially diffraction-limited performance over the entire field, said objective comprising successively a front concavo-convex singlet lens element I which is nearest to and is concave toward the object, a second concavo-convex singlet lens member II spaced rearwardly from the first lens member and having its concave side facing said object, a plano-convex lens member III having its plano side spaced from said second lens member, a compound meniscus lens member IV composed of a front double convex lens element spaced rearwardly from said plano-convex member and further composed of a double concave lens element in contact with the rear side of the double convex element, a double convex singlet lens member V spaced rearwardly of said compound lens member, and a meniscus singlet lens member VI having a concave surface facing rearwardly, said lens members being optically aligned with each other, the radii of curvature $R_1$ to $R_{13}$ of the successive lens surfaces for the lens members and elements having numerical values which are given in the table of mathematical expressions given herebelow wherein the minus (—) sign denotes radii whose centers of curvature lie on the object side of the vertex of the respective surfaces, the values for the successive interlens air spaces $S_1$ to $S_5$, and the values for the axial lens thicknesses $t_1$ to $t_7$ being as given in the aforesaid table, wherein F designates the equivalent focal length of said objective, and $n_D$ and $\nu$ designate respectively the refractive index and Abbe number of the lens elements, $\dfrac{-R_1}{-R_2} = .682$  $\dfrac{-R_3}{-R_4} = 1.419$ $\dfrac{R_5}{-R_6} = 6.290$  $\dfrac{R_7}{-R_8} = 1.831$ $\dfrac{R_9}{-R_8} = 1.902$  $\dfrac{R_{10}}{-R_{11}} = 7.16$ $\dfrac{R_{12}}{R_{13}} = 1.443$ $t_1 = .794F$
$t_2 = .167F$
$t_3 = .348F$
$t_4 = .557F$
$t_5 = .1395F$
$t_6 = .418F$
$t_7 = .362F$ $S_1 = S_2 = S_3 = .01395F$
$S_4 = 2.226F$
$S_5 = .167F$ $n_D(I) = n_D(II) = n_D(III) = \begin{Bmatrix} n_D(IV) \\ \text{for positive element} \end{Bmatrix} = 1.620$ $\begin{Bmatrix} n_D(IV) = 1.805 \\ \text{for negative element} \end{Bmatrix}$ $n_D(V) = 1.617$
$n_D(VI) = 1.720$ $\nu(I) = \nu(II) = \nu(III) = \begin{Bmatrix} \nu(IV) \\ \text{for positive element} \end{Bmatrix} = 60.3$ $\begin{Bmatrix} \nu(IV) \\ \text{for negative element} \end{Bmatrix} = 25.4$ $\nu(V) = 36.6$
$\nu(VI) = 29.3$ 10. A microscope objective having a magnification of substantially 30×, a numerical aperture of substantially 0.65, and comprising a front positive meniscus lens member I, a second positive meniscus lens member II, a collective lens member III, a compound positive lens member IV composed of a front positive lens element and a rear negative lens element, a second collective lens member V, and a rearmost negative meniscus lens member VI, all of said lens members being optically aligned and spaced from each other, the successive lens members I to VI having focal lengths $F_I$ to $F_{VI}$ respectively wherein the minus (—) sign designates negative power, and wherein $R_1$ to $R_{13}$ designate the radii of curvature of the successive lens surfaces and the minus (—) sign used therewith denotes radii whose centers of curvature lie on the object side of the vertex of the respective surface, $t_1$ to $t_7$ represents the axial thicknesses of the successive lens elements, $S_1$ to $S_5$ represents the successive interlens air spaces, and $n_D$ and $\nu$ represent the refractive index and Abbe number respectively and wherein E.F.L. and N.A. designate the equivalent focal length and numerical aperture respectively, all scalar quantities being given in millimeters,

[E.F.L.=7.1686; magnification=30X; N.A.=0.65]

| Lens | Focal Length | Radii | Thicknesses | Spaces | $n_D$ | $\nu$ |
|---|---|---|---|---|---|---|
| I | $F_I = 21.824$ | $-R_1 = 2.8054$<br>$-R_2 = 4.1305$ | $t_1 = 5.7$ | $S_1 = 0.1$ | 1.620 | 60.3 |
| II | $F_{II} = 49.220$ | $-R_3 = 14.191$<br>$-R_4 = 10.000$ | $t_2 = 1.2$ | $S_2 = 0.1$ | 1.620 | 60.3 |
| III | $F_{III} = 18.348$ | $R_5 = \infty$<br>$-R_6 = 11.376$ | $t_3 = 2.5$ | $S_3 = 0.1$ | 1.620 | 60.3 |
| IV | $F_{IV} = 41.807$ | $R_7 = 15.849$<br>$-R_8 = 8.6298$<br>$R_9 = 16.444$ | $t_4 = 4.0$<br>$t_5 = 1.0$ | $S_4 = 16.0$ | 1.620<br>1.805 | 60.3<br>25.4 |
| V | $F_V = 27.307$ | $R_{10} = 136.77$<br>$-R_{11} = 19.055$ | $t_6 = 3.0$ | $S_5 = 1.2$ | 1.617 | 36.6 |
| VI | $F_{VI} = -58.902$ | $R_{12} = 14.191$<br>$R_{13} = 9.8175$ | $t_7 = 2.6$ | | 1.720 | 29.3 |

The object distance between the front vertex of lens I and the object surface includes a cover plate of .18 mm. thickness and the distance $S_0$ from said vertex to the plate is 0.63 mm.

No references cited.

JEWELL H. PEDERSEN, *Primary Examiner*.

UNITED STATES PATENT OFFICE

CERTIFICATE OF CORRECTION

Patent No. 3,174,396             March 23, 1965

Paul L. Ruben

It is hereby certified that error appears in the above numbered patent requiring correction and that the said Letters Patent should read as corrected below.

Column 2, line 21, for "$7.38F < F_{VI} < 9.02F$" read -- $7.38F < -F_{VI} < 9.02F$ --.

Signed and sealed this 17th day of August 1965.

(SEAL)
Attest:

ERNEST W. SWIDER
Attesting Officer

EDWARD J. BRENNER
Commissioner of Patents